US012732006B2

(12) United States Patent
Zhou et al.

(10) Patent No.: US 12,732,006 B2
(45) Date of Patent: Sep. 8, 2026

(54) ARCING PREVENTION THROUGH INPUT VOLTAGE LOOP

(71) Applicant: Renesas Electronics America Inc., Milpitas, CA (US)

(72) Inventors: Fengshuan Zhou, Cary, NC (US); Yen-Mo Chen, Morrisville, NC (US); Sungkeun Lim, Apex, NC (US); Fa Chen, Morrisville, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 955 days.

(21) Appl. No.: 18/059,157

(22) Filed: Nov. 28, 2022

(65) Prior Publication Data

US 2024/0178680 A1 May 30, 2024

(51) Int. Cl.
*H02J 7/00* (2026.01)
*H02J 7/64* (2026.01)

(52) U.S. Cl.
CPC .................................... *H02J 7/64* (2026.01)

(58) Field of Classification Search
USPC ........................................................ 320/109
See application file for complete search history.

(56) References Cited

U.S. PATENT DOCUMENTS 9,197,085 B2 * 11/2015 Yamaguchi ............. B60L 50/16
2019/0379212 A1 * 12/2019 Cho ......................... G06N 3/08
2021/0057927 A1 * 2/2021 Kazuno .................. H02J 9/002

* cited by examiner

*Primary Examiner* — Samuel Berhanu
(74) *Attorney, Agent, or Firm* — SCULLY, SCOTT, MURPHY & PRESSER, P.C.

(57) ABSTRACT

Systems and methods for operating a battery charger are described. A controller of a battery charger can measure an input voltage of power being provided to an input port of a battery charger. The controller can, in response to the input voltage being less than a reference voltage, operate an input voltage control loop to regulate a voltage level of the input voltage to a predetermined voltage level. The voltage difference, between the plug voltage of a power source and the receptacle voltage of a power sink, can be regulated below an arcing voltage. The controller can, in response to a lapse of a predetermined amount of time, discharging the input voltage.

18 Claims, 6 Drawing Sheets

ARCING PREVENTION THROUGH INPUT VOLTAGE LOOP

BACKGROUND OF THE SPECIFICATION

The present disclosure relates in general to semiconductor devices. More specifically, the present disclosure relates to using an input voltage loop to prevent arcing between battery chargers and power supply or power source.

Devices that include battery chargers can include one or more ports, such as a universal serial bus (USB) port, that receives power. The received power can be used for charging one or more batteries in the device, and/or for providing power to a load in the device or a load connected to the device. The battery charger can include one or more charger modules, and each port (or each USB port) can be connected to an individual charger module. The battery charger can further include a controller configured to control operations of the charger module. The battery charger can further include various circuits and integrated circuits (IC) that can detect various quantitative measurements of the battery charger. The detected quantitative measurements can be provided to one or more control loops implemented by the controller and the controller can adjust parameters and/or settings of the charger module to optimize performances such as efficiency and power consumption, and to prevent hazardous conditions related to the battery charger.

SUMMARY

In one embodiment, a method for operating a battery charger is generally described. The method can include measuring an input voltage of power being provided to an input port of a battery charger. The method can further include determining the measured input voltage being less than a reference voltage. The method can further include, in response to the input voltage being less than the reference voltage, operating an input voltage control loop to regulate a voltage level of the input voltage to a predetermined voltage level. The method can further include determining a lapse of a predetermined amount of time. The method can further include, in response to a lapse of the predetermined amount of time, discharging the input voltage.

In one embodiment, a semiconductor device for operating a battery charger is generally described. The semiconductor device can include a controller configured to measure input voltage of power being provided to an input port of a battery charger. The semiconductor device can further include an integrated circuit configured to, in response to the input voltage being less than a reference voltage, select an input voltage control loop. The controller can be further configured to operate the selected input voltage control loop to regulate a voltage level of the input voltage to a predetermined voltage level. The controller can be further configured to, in response to a lapse of a predetermined amount of time, send a signal to a discharge circuit to discharge the input voltage.

In one embodiment, an apparatus for operating a battery charger is generally described a battery module. The apparatus can include a switching circuit configured to convert an input voltage into system voltage for charging the battery module. The input voltage can be received at an input port of a battery charger. The apparatus can further include a controller configured to measure the input voltage. The controller can be further configured to, in response to the input voltage being less than a reference voltage, select an input voltage control loop. The controller can be further configured to operate the switching circuit in accordance with the selected input voltage control loop to regulate a voltage level of the input voltage to a predetermined voltage level. The controller can be further configured to, in response to a lapse of a predetermined amount of time, send a signal to a discharge circuit to discharge the input voltage.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
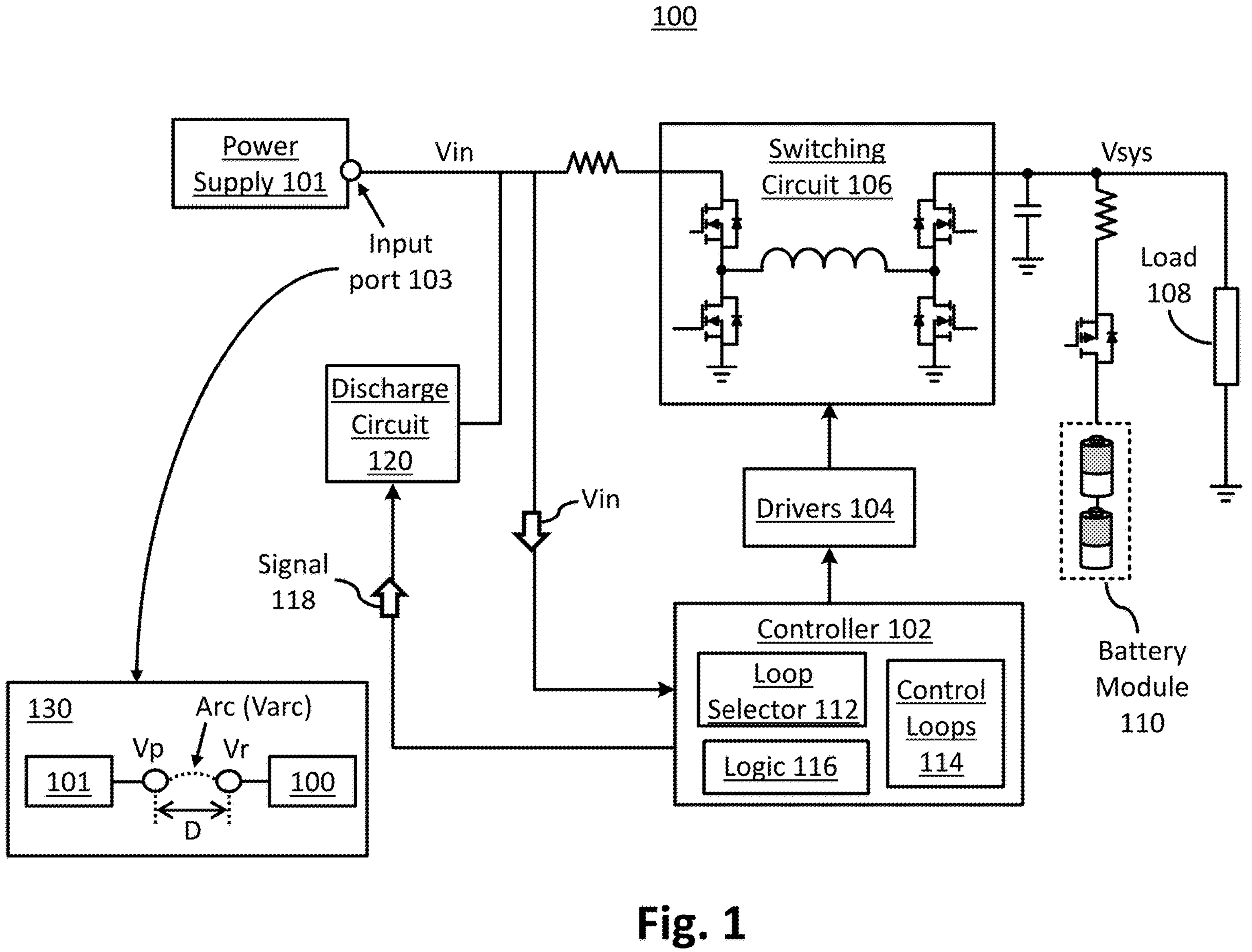
FIG. 1 is a diagram showing an apparatus that can implement arcing prevention through input voltage loop in one embodiment.

FIG. 1 is a diagram showing an apparatus that can implement arcing prevention through input voltage loop in one embodiment. An apparatus 100, shown in FIG. 1, can include a controller 102, one or more drivers 104, a switching circuit 106, and a battery module 110. In one embodiment, a load 108 can be connected to apparatus 100 (e.g., connected to an output of switching circuit 106). In another embodiment, load 108 can be a part of apparatus 100. Apparatus 100 can be an electronic device, such as, for example, a battery charger, a desktop computer, a laptop computer, a tablet device, a smartwatch, a cellular phone, a smartphone, a wearable device, an e-cigarette, or the like. Battery module 110 can be a battery pack including at least one battery. Switching circuit 106 can include at least switches (e.g., metal-oxide-semiconductor field-effect transistor (MOSFET)) arranged in a full-bridge configuration.

Controller 102 can be a microcontroller configured to provide control signals (e.g., pulse width modulation (PWM) control signals) to drivers 104. Drivers 104 can receive the control signals from controller 102 and drive the switches in switching circuit 106. When a power source, such as a power supply 101, is connected to apparatus 100, or connected to switching circuit 106 via an input port 103 of apparatus 100, the switches in switching circuit 106 can be driven by drivers 104 to convert an input voltage (Vin) of power being supplied by power supply 101 into a system voltage Vsys (or output voltage). Battery module 110 can be charged by Vsys, and load 108 can draw current from battery module 110. In the embodiment shown in FIG. 1, apparatus 100 can further include a discharge circuit 120. Discharge circuit 120, when activated or enabled, can discharge voltage between input port 103 and switching circuit 106.

Controller 102 can be further configured to execute at least one control loop among control loops 114 to maintain performance parameters of apparatus 100. In an aspect, a control loop can be implemented by at least one analog and/or digital components of controller 102 and sometimes software and/or firmware being executed by controller 102. To execute a control loop, quantitative measurements (e.g., voltage, current, or other measurements) obtained from various points in apparatus 100 can be inputted to a corresponding control loop. Controller 102 can perform comparisons of the quantitative measurements with reference values. Results of the comparison can be used by controller 102 to improve performance parameters of apparatus 100. Controller 102 can use results or outputs from control loops 114 to determine whether adjustments are needed for various performance parameters of apparatus 100.

Controller 102 can further include components, such as digital to analog converters (DACs), comparators, mixers, memory devices (e.g., registers), and other electronic components. In one embodiment, controller 102 can include memory devices, such as registers, configured to store various predetermined values (e.g., digital representation of reference voltages, reference currents, or the like) that can be used by control loops 114. For example, registers in controller 102 can store digital value of predetermined values that can be converted by the DACs in controller 102 into analog signals. The analog signals can be provided to control loops 114 as reference values being inputted into the comparators of controller 102. Controller 102 can include a loop selector 112 configured to select a control loop among control loops 114 based on quantitative measurements obtained from apparatus 100. Loop selector 112 can be, for example, a logic circuit or an integrated circuit (IC) and can be integrated in the same semiconductor package or chip as controller 102.

In an aspect, power supply 101 can be considered as a power source (e.g., the side providing power) and apparatus 100 can be considered as a power sink (e.g., the side consuming power). When a power source and a power sink are connected (e.g., via input port 103), terminal voltage of the power source and power sink shall be the same (e.g., as represented by Vin) and the power source can provide power to the power sink. In response to disconnecting the power sink from the power source, power at the power sink will discharge (e.g., drop), but power at the power source will remain the same, and an arc voltage can begin to increase. Arc voltage is voltage that exists on contacts (of the power source and the power sink) separated by a small gap that will cause an electric discharge across the gap, and arc current is current necessary to sustain an arc (e.g., sometimes visible as a flash or spark) caused by the electric discharge.

In one embodiment, input port 103 can be a universal serial bus (USB) port. Some versions of USB may require high voltage power delivery. For example, universal serial bus power delivery (USB-PD) version 3.1 can offer up to 240 W power delivery, and the highest voltage can be increased from 20 voltage direct current (VDC) (Standard Power Range) to 48 VDC (Extended Power Range). The risk for potential damage from arcing increases because of this higher voltage.

In an example shown in FIG. 1, a disconnection 130 shows a case when power supply 101 is disconnected from input port 103 of apparatus 100 whereby terminal voltages of power supply 101 and apparatus 100 will be different. The terminal voltage of power supply 101 is labeled as Vp (e.g., voltage), and the terminal voltage of apparatus 100 is labeled as Vr (e.g., receptacle voltage). An arc voltage Varc can increase as a distance D between power supply 101 and apparatus 100 increases (e.g., power supply 101 sink continues to be further away from apparatus 100). Distance D will eventually reach a safe distance where the power source and power sink are far apart enough such that the arcing current no longer exists. Along with Varc, a voltage difference Vp-Vr will start to increase in response to the disconnection as well, since Vp remains constant. If the voltage difference Vp-Vr increases to a predetermined hazardous arcing voltage (e.g., 12 volts (V)) within a specific time and while the distance D is still less the safe distance, then hazardous electrical conditions such as damages to the power sink, fire, and injuries can occur.

To mitigate arcing in response to apparatus 100 being disconnect from power supply 101, controller 102 can include a logic 116 configured to select an input voltage loop among control loops 114 to slow down the increase rate of the voltage difference Vp-Vr. In one embodiment, logic 116 can be a part of loop selector 112. In one embodiment, logic 116 can be an IC integrated in the same semiconductor package or chip as loop selector 112 and controller 102. Logic 116 can also maintain the selected input voltage loop for a predetermined amount of time and suspend operations of discharge circuit 120 (e.g., deactivate or disable discharge circuit 120) such that discharge does not take place immediately following the disconnection. In response to a lapse of the predetermined amount of time, logic 116 can send a signal 118 to discharge circuit 120 to begin discharge (e.g., decrease Vr at a higher rate). By slowing down the increase rate of voltage difference Vp-Vr, and delaying the discharge, the voltage difference Vp-Vr can remain less than the predetermined hazardous voltage level until the distance D reaches a safe distance (e.g., power source and power sink being too far from one another to cause arcing).

Some conventional solutions to mitigate arcing is to insert bulk capacitors to limit a slew rate of Vr. However, these bulk capacitors can be relatively large and thus increases bill of material (BOM) cost. Other conventional solutions to mitigate arcing is to remove or disconnect the load in response to the power sink being removed from the power source. However, there are significant challenges in timing the load removal correctly. Further, there is a risk of mistakenly removing a load if there is a false detection of disconnection between the power sink and power source. Debouncing can be used for addressing the risk of mistakenly removing a load, but debouncing will introduce unwanted delay.

The utilization of logic 116 to operate an input voltage loop and to delay the discharge can mitigate arcing while preserving circuit board space and BOM cost. Further, logic 116 monitors input voltage Vin, instead of waiting for a confirmed disconnection between apparatus 100 and power supply 101, thus reducing latency. Operating the input voltage loop to slow down the increase rate of the voltage difference Vp-Vr can also avoid a need to completely remove load 108, thus improving stability of the entire system.

Figure 2:
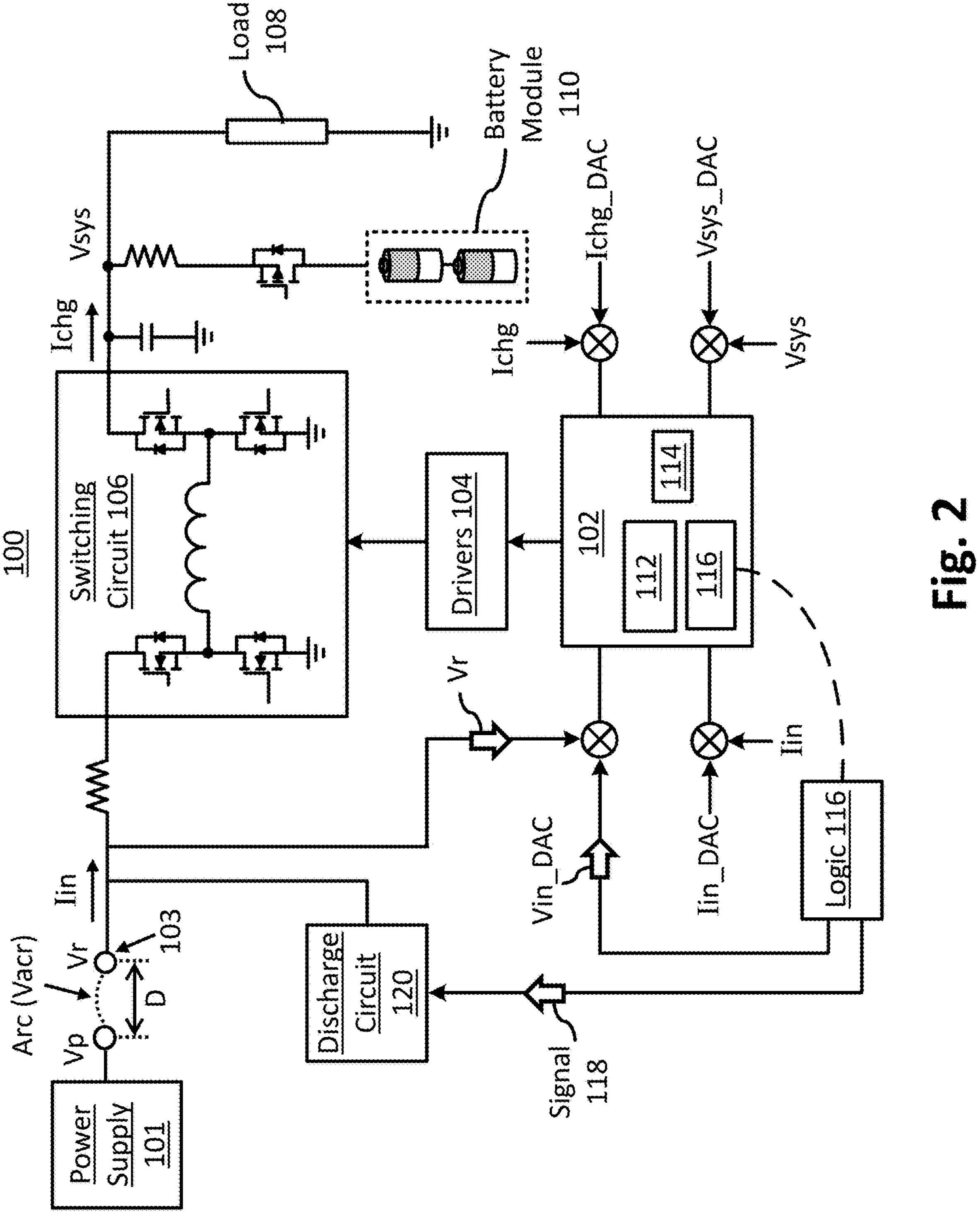
FIG. 2 is a diagram showing details of the system of FIG. 1 in one embodiment.

FIG. 2 is a diagram showing details of the system of FIG. 1 in one embodiment. In an embodiment shown in FIG. 1, control loops 114 can include, but not limited to, a charger current control loop, a system voltage control loop, an input current control loop, and an input voltage control loop. Charger current control loop can be a control loop for monitoring a current Ichg being drawn from battery module 110 to load 108. System voltage control loop can be a control loop for monitoring Vsys. Input current control loop can be a control loop for monitoring current Iin created by input voltage Vin. Input voltage control loop can be a control loop for monitoring Vin when apparatus 100 is connected to power supply 101, or for monitoring Vr when apparatus 100 is disconnected from power supply 101.

Controller 102 can include memory devices configured to store a plurality of digital reference measurements that can be converted into analog reference signals by DACs of controller 102. In the embodiment shown in FIG. 2, controller 102 use references signals Ichg_DAC, Vsys_DAC, Iin_DAC, and Vin_DAC outputted from DACs to operate the charger current control loop, the system voltage control loop, the input current control loop, and the input voltage control loop, respectively, in control loops 114. The input voltage control loop can be a control loop to regulate voltage Vr at input port 103 to a predetermined voltage level.

In response to input port 103 being disconnected from power supply 101, input voltage Vin (see FIG. 1) can drop and become receptacle voltage Vr. Receptacle voltage Vr can be a voltage measured between input port 103 and switching circuit 106 when input port 103 is disconnected from power supply 101. Vr can be monitored (e.g., continuously measured) by controller 102. If Vr drops below less than Vin_DAC, then loop selector 112 can select the input voltage loop in control loops 114. Controller 102 can implement or operate the selected input voltage loop to regulate or hold Vr to a predetermined voltage level, for a predetermined amount of time. In one embodiment, controller 102 can operate switching circuit 106 to reduce system load or charge current Ichg to regulate Vr at the predetermined voltage level. In another embodiment, controller 102 can switch off or deactivate switching circuit 106 to reduce system load or charge current Ichg to zero in order to regulate Vr at the predetermined voltage level.

In one embodiment, reference signal Vin_DAC can have a voltage level that decides if the input voltage loop needs to be engaged to regulate Vin (when power supply 101 is connected to input port 103) or Vr (when power supply 101 is disconnected from input port 103). In another embodiment, Vin_DAC can have a voltage level that that indicates whether power supply 101 is disconnected from input port 103.

In one embodiment, Vin_DAC can be based on bus voltages on the power source side (e.g., power supply) and the power sink side (e.g., apparatus 100). On the power sink side (e.g., apparatus 100), bus voltage VBUS can be a voltage measured from a bus or trace between input port 103 and switching circuit 106. In an example, if VBUS is 48V with a +/−5% tolerance, then a lowest voltage under connected condition (when power supply 101 is connected to input port 103) is 48V*0.95-0.75V(max. cable IR)=44.85V, and any voltage level lower than 44.85V can be considered as a cable unplugging event, therefore 44.85V can be set at a maximum value of Vin_DAC. On the power source side (e.g., power supply 101) a highest voltage, with +/−5% tolerance, under connected condition can be approximately 48V*1.05=50.4V. To prevent arcing, VIN_DAC shall be higher than 50.4V-12V(arcing voltage)+1V(margin)=39.4V, thus a minimum value of VIN_DAC can be set to 39.4V.

Figure 3A:
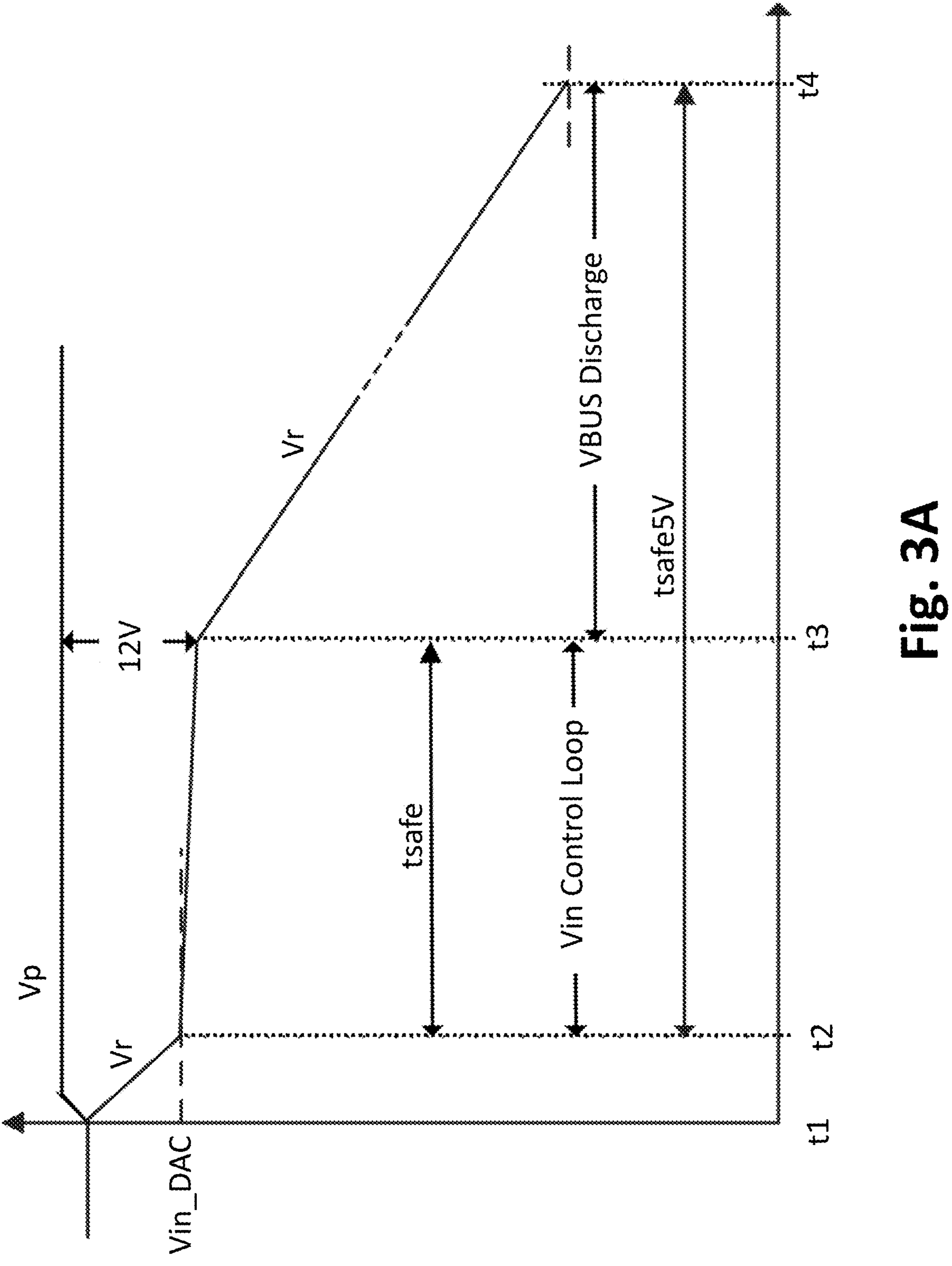
FIG. 3A is a diagram showing a waveform of a receptacle voltage resulting from an implementation of arcing prevention through input voltage loop in one embodiment.

FIG. 3A is a diagram showing a waveform of a receptacle voltage resulting from an implementation of arcing prevention through input voltage loop in one embodiment. In FIG. 3A, at a time t1, input port 103 can be disconnected from power supply 101 (see FIG. 1, FIG. 2). Receptacle voltage Vr can start to decrease in response to the disconnection. At time t2, Vr becomes less than Vin_DAC. Logic 116 (see FIG. 1, FIG. 2) can select and engage an input voltage control loop to regulate Vr to a predetermined voltage level, such as a voltage level that can be approximately equivalent to Vin_DAC. In one embodiment, Vr can be regulated by the input voltage loop to a predetermine voltage level where the voltage difference Vp−Vr is less than a hazardous arcing voltage (e.g., 12V).

The input voltage control loop can be engaged for a predetermined amount of time (e.g., tsafe) equivalent to t2−t1. In one embodiment, t2−t1 can be approximately 250 microseconds (μs). The predetermined amount of time can be based on a safe distance between the disconnected input port 103 and power supply 101. For example, arcing voltage can increase with the distance between the disconnected input port 103 and power supply 101 (the distance being labeled as D in FIG. 1, FIG. 2). The predetermined amount of time t2−t1 can be a time that is less than a benchmark time for the arc voltage to reach the hazardous arcing voltage. Hence, holding Vr to a predetermined voltage level, where the voltage difference Vp−Vr is less than a hazardous arcing voltage, for the predetermined amount of time t2−t1 can prevent arcing.

At t3, in response to a lapse of the predetermined amount of time t2−t1, logic 116 or controller 102 can send signal 118 to discharge circuit 120 (see FIG. 1, FIG. 2) to discharge Vr (which can be bus voltage VBUS between input port 103 and switching circuit 106). Vr can be discharged at a rate to reach a benchmark safe voltage, such as 5V, within a predefined time according to industry standards (e.g., t4-t3). Therefore, the implementation of an input voltage control loop described herein, in response to a disconnection between a power sink and a power source, can delay discharging Vr to prevent arcing while being compliant with industry standards.

Figure 3B:
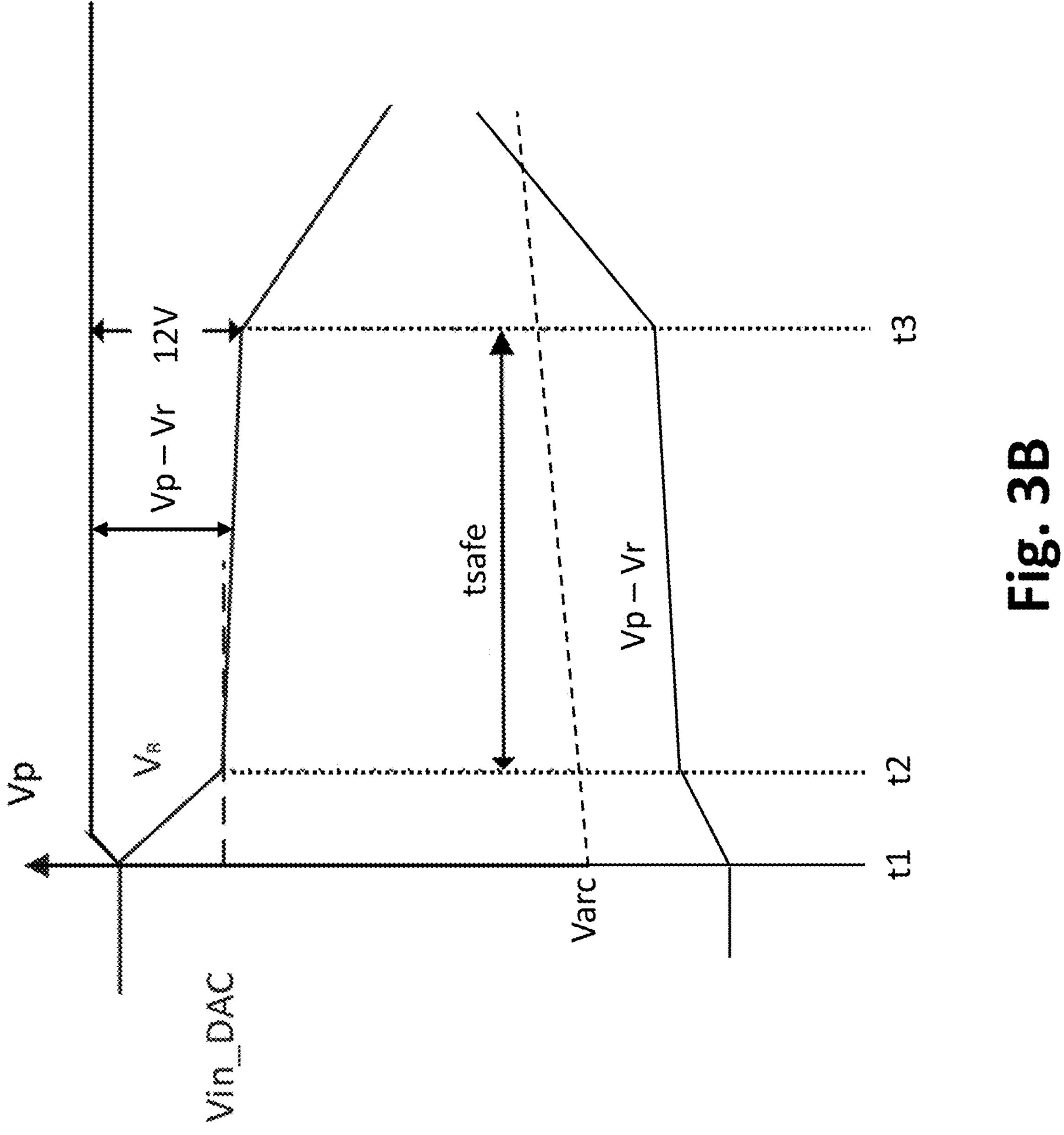
FIG. 3B is a diagram showing additional waveforms resulting from an implementation of arcing prevention through input voltage loop in one embodiment.

FIG. 3B is a diagram showing additional waveforms resulting from an implementation of arcing prevention through input voltage loop in one embodiment. In FIG. 3B, at time t1, arcing voltage can begin to increase in response to the disconnection between input port 103 and power supply 101 (see FIG. 1, FIG. 2), and Vr can start to decrease in response to the disconnection. As Vr decreases, the voltage difference Vp−Vr can increase since Vp remains constant. At time t2, Vr becomes less than Vin_DAC and logic 116 (see FIG. 1, FIG. 2) can select and engage an input voltage control loop to regulate Vr to a predetermined voltage level. As Vr is being regulated by input voltage control loop, the voltage difference Vp−Vr can still increase but at a slower rate when compared to situations where input voltage control loop is not implemented at time t2. The input voltage control loop can be engaged for a predetermined amount of time (e.g., tsafe) equivalent to t2−t1. At t3, Vr can begin to discharge and the voltage difference Vp−Vr can increase at a faster rate.

Figure 4:
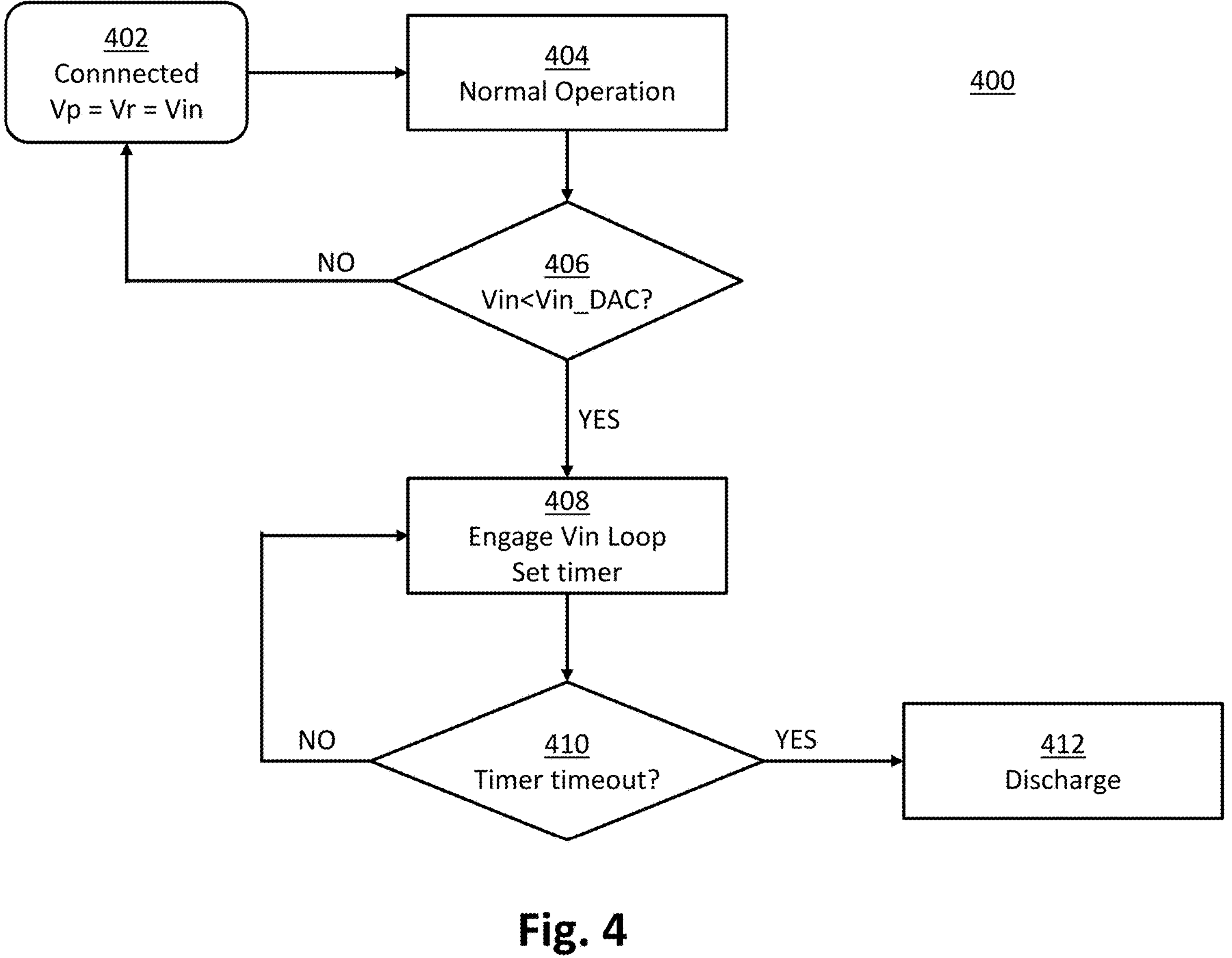
FIG. 4 is a flowchart of an example process that can implement arcing prevention through input voltage loop in one embodiment.

FIG. 4 is a diagram a flowchart of an example process that can implement arcing prevention through input voltage loop in one embodiment. A process 400 in FIG. 4 may be implemented using, for example, apparatus 100 discussed above. Process 400 can include one or more operations, actions, or functions as illustrated by one or more of blocks 402, 404,406, 408, 410 and/or 412. Although illustrated as discrete blocks, various blocks may be divided into additional blocks, combined into fewer blocks, eliminated, performed in different order, or performed in parallel, depending on the desired implementation.

Process 400 can be implemented by a controller of a power sink device, such as a controller of a battery charger. Process 400 can begin at block 402, where a power source can be connected to a power sink. In one embodiment, the power source can be connected to the power sink using a USB port of the power sink. When the power source and power sink are connected, a terminal voltage of the power source Vp, and a terminal voltage of the power sink Vr, can be equivalent to one another and can be equivalent to an input voltage Vin.

Process 400 can proceed from block 402 to block 404. At block 404, the power source and power sink can operate normally. Normal operation can include, for example, having the power source charge the power sink using Vin.

Process 400 can proceed from block 404 to block 406. At block 406, a controller of the power sink can monitor Vin and compare the monitored Vin with a reference voltage Vin_DAC. If Vin is greater than or equal to Vin_DAC, then process 400 can return to block 402. Vin being greater than or equal to Vin_DAC can indicate that the power source and the power sink are still connected. If Vin is less than Vin_DAC, then process 400 can proceed to block 408. Vin being less than Vin_DAC can indicate that the power source and the power sink are disconnected. In response to the disconnection, Vp can remain constant, input voltage in being monitored can become Vr (e.g., the controller of the power sink now monitors Vr) and Vr can begin to decrease.

At block 408, the controller of the power sink can engage an input voltage control loop (Vin loop) and set a timer to a predetermined amount of time. The input voltage control loop can hold or regulate Vr to a voltage level that prevents a voltage difference Vp−Vr from exceeding a hazardous arcing voltage. The predetermined amount of time being set can be a time before an arcing voltage caused by the disconnection increases to the hazardous arcing voltage.

Process 400 can proceed from block 408 to block 410. At block 410, the controller of the power sink can monitor the timer and determine whether the timer has timed out (e.g., whether the predetermined amount of time has lapsed). If the timer has yet to timeout, process 400 can return to block 408 to continue implementing the input voltage loop (but not to set the timer again). If the timer has timed out, process 400 can proceed to block 412.

At block 412, the controller of the power sink can facilitate discharge of Vr. In one embodiment, the controller of the power sink can send a signal to a discharge circuit of the power sink to discharge Vr.

Figure 5:
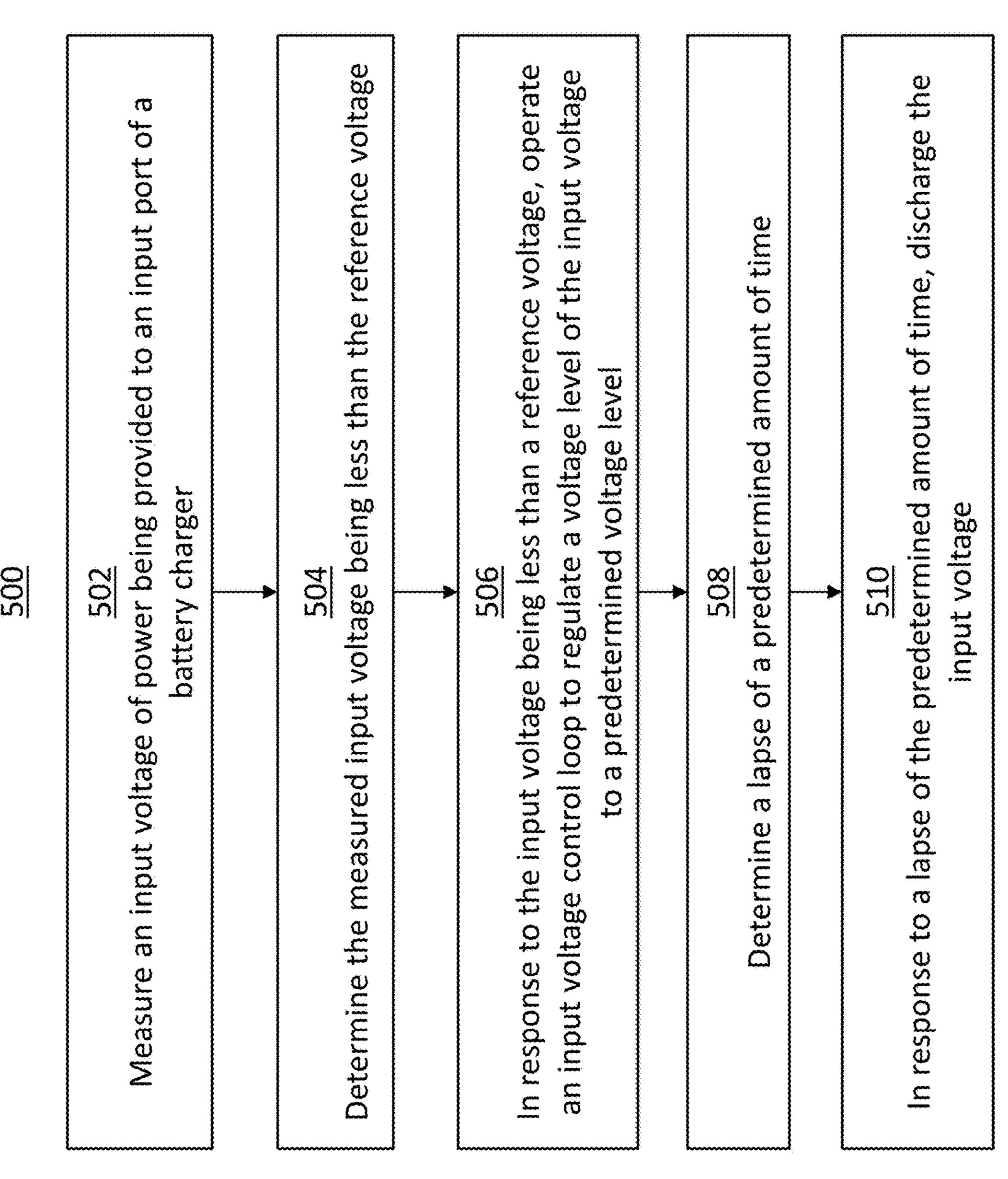
FIG. 5 is a flowchart of another example process that can implement arcing prevention through input voltage loop in one embodiment.

FIG. 5 is a diagram a flowchart of another example process that can implement arcing prevention through input voltage loop in one embodiment. A process 500 in FIG. 5 may be implemented using, for example, apparatus 100 discussed above. Process 500 can include one or more operations, actions, or functions as illustrated by one or more of blocks 502, 504 and/or 506. Although illustrated as discrete blocks, various blocks may be divided into additional blocks, combined into fewer blocks, eliminated, performed in different order, or performed in parallel, depending on the desired implementation.

Process 500 can be implemented by a controller of a power sink device, such as a controller of a battery charger. Process 500 can begin at block 502. At block 502, the controller can measure an input voltage of power being provided to an input port of a battery charger. In one embodiment, the input port can be a universal serial bus (USB) port.

Process 500 can proceed from block 502 to block 504. At block 504, the controller can determine that the measured input voltage is less than a reference voltage. Process 500 can proceed from block 504 to block 506. At block 506, the controller can, in response to the input voltage being less than the reference voltage, operate an input voltage control loop to regulate a voltage level of the input voltage to a predetermined voltage level. In one embodiment, operating the input voltage control loop can include reducing a charge current of the battery charger. In one embodiment, operating the input voltage control loop comprises deactivating a switching circuit of the battery charger.

In one embodiment, the input voltage can be less than the reference voltage in response to the input port being disconnected from a power supply. In one embodiment, the input voltage can be a receptacle voltage of the battery charger in response to the input port being disconnected from the power supply. The input voltage being regulated at the predetermined voltage level can cause a voltage difference, between a plug voltage of the power source and the receptacle voltage of a power sink, to be regulated below an arc voltage caused by the disconnection of the input port from the power supply.

Process 500 can proceed from block 506 to block 508. At block 508, the controller can determine a lapse of a predetermined amount of time. Process 500 can proceed from block 508 to block 510. At block 510, the controller can, in response to the lapse of the predetermined amount of time, discharge the input voltage. In one embodiment, the predetermined time can be based on an arcing prevention distance between the battery charger and a power supply.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising.” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for operating a battery charger, the method comprising:

measuring an input voltage of power being provided to an input port of the battery charger;

determining the measured input voltage being less than a reference voltage;

in response to the input voltage being less than the reference voltage, operating an input voltage control loop to regulate a voltage level of the input voltage to a predetermined voltage level;

determining a lapse of a predetermined amount of time, wherein the predetermined amount of time is based on an arcing prevention distance between the battery charger and a power source; and in response to the lapse of the predetermined amount of time, discharging the input voltage.

2. The method of claim 1, wherein operating the input voltage control loop comprises reducing a charge current of the battery charger.

3. The method of claim 1, wherein operating the input voltage control loop comprises deactivating a switching circuit of the battery charger.

4. The method of claim 1, wherein the input voltage is less than the reference voltage in response to the input port being disconnected from the power source.

5. The method of claim 4, wherein:

the input voltage is a receptacle voltage of the battery charger in response to the input port being disconnected from the power source; and the input voltage being regulated at the predetermined voltage level causes a voltage difference, between a plug voltage of the power source and the receptacle voltage of a power sink, to be regulated below an arc voltage caused by the disconnection of the input port from the power source.

6. The method of claim 1, wherein the input port is a universal serial bus (USB) port.

7. A semiconductor device comprising:

a controller configured to measure input voltage of power being provided to an input port of a battery charger; and an integrated circuit configured to, in response to the input voltage being less than a reference voltage, select an input voltage control loop, wherein the controller is further configured to:

operate the selected input voltage control loop to regulate a voltage level of the input voltage to a predetermined voltage level; and in response to a lapse of a predetermined amount of time, send a signal to a discharge circuit to discharge the input voltage, wherein the predetermined amount of time is based on an arcing prevention distance between the battery charger and a power source.

8. The semiconductor device of claim 7, wherein the controller is configured to reduce a charge current of the battery charger to operate the input voltage control loop.

9. The semiconductor device of claim 7, wherein the controller is configured to deactivate a switching circuit of the battery charger to operate the input voltage control loop.

10. The semiconductor device of claim 7, wherein the input voltage is less than the reference voltage in response to the input port being disconnected from the power source.

11. The semiconductor device of claim 10, wherein:

the input voltage is a receptacle voltage of the battery charger in response to the input port being disconnected from the power source; and the input voltage being regulated at the predetermined voltage level causes a voltage difference, between a plug voltage of the power source and the receptacle voltage of a power sink, to be regulated below an arc voltage caused by the disconnection of the input port from the power source.

12. The semiconductor device of claim 7, wherein the input port is a universal serial bus (USB) port.

13. An apparatus comprising:

a battery module;

a switching circuit configured to convert an input voltage into system voltage for charging the battery module, wherein the input voltage is received at an input port of a battery charger; and a controller configured to:

measure the input voltage;

in response to the input voltage being less than a reference voltage, select an input voltage control loop;

operate the switching circuit in accordance with the selected input voltage control loop to regulate a voltage level of the input voltage to a predetermined voltage level; and in response to a lapse of a predetermined amount of time, send a signal to a discharge circuit to discharge the input voltage, wherein the predetermined amount of time is based on an arcing prevention distance between the battery charger and a power source.

14. The apparatus of claim 13, wherein a load is connected to the battery module, and the controller is configured to reduce a charge current from the input port to the battery module to operate the input voltage control loop.

15. The apparatus of claim 13, wherein the controller is configured to deactivate the switching circuit to operate the input voltage control loop.

16. The apparatus of claim 13, wherein the input voltage is less than the reference voltage in response to the input port being disconnected from the power source.

17. The apparatus of claim 16, wherein:

the input voltage is a receptacle voltage in response to the input port being disconnected from the power source; and the input voltage being regulated at the predetermined voltage level causes a voltage difference, between a plug voltage of the power source and the receptacle voltage of a power sink, to be regulated below an arcing voltage caused by the disconnection of the input port from the power source.

18. The apparatus of claim 13, wherein the input port is a universal serial bus (USB) port.

* * * * *